US008750806B2

(12) United States Patent  (10) Patent No.: US 8,750,806 B2
Weil et al.  (45) Date of Patent: Jun. 10, 2014

(54) IDENTIFYING CORRELATIONS WITHIN WIRELESS NETWORKS

(75) Inventors: Kevin Weil, Redwood City, CA (US); Mukesh Gupta, Milpitas, CA (US); Amit Saha, Sunnyvale, CA (US); Cyrus Behroozi, Menlo Park, CA (US); Devabhaktuni Srikrishna, Sunnyvale, CA (US)

(73) Assignee: Tropos Networks, Inc., Sunnyvale, CA (US)

( * ) Notice: Subject to any disclaimer, the term of this patent is extended or adjusted under 35 U.S.C. 154(b) by 953 days.

(21) Appl. No.: 11/881,253

(22) Filed: Jul. 26, 2007

(65) Prior Publication Data

US 2008/0247327 A1 Oct. 9, 2008

Related U.S. Application Data

(60) Provisional application No. 60/921,761, filed on Apr. 3, 2007.

(51) Int. Cl.
 *H04W 24/00* (2009.01)
(52) U.S. Cl.
 USPC ............ 455/67.11; 455/67.14; 455/423; 455/436; 455/453; 455/7; 455/456.1; 455/552.1; 455/425; 455/432.1; 455/424; 370/230; 370/238; 370/328; 370/351; 370/254
(58) Field of Classification Search
 USPC ............ 455/67.11, 67.14, 423, 522, 62, 436, 455/453, 7, 456.1, 425; 370/230–341, 351, 370/400–401, 410
See application file for complete search history.

(56) References Cited

U.S. PATENT DOCUMENTS

| | | | | |
|---|---|---|---|---|
| 6,321,271 B1 * | 11/2001 | Kodialam et al. | ............. | 709/241 |
| 6,522,881 B1 * | 2/2003 | Feder et al. | .................. | 455/437 |
| 6,711,409 B1 * | 3/2004 | Zavgren et al. | ............... | 455/445 |
| 6,735,178 B1 * | 5/2004 | Srivastava et al. | ............ | 370/252 |
| 6,965,575 B2 * | 11/2005 | Srikrishna et al. | ............ | 370/252 |
| 7,058,021 B2 * | 6/2006 | Srikrishna et al. | ............ | 370/252 |
| 7,376,087 B2 * | 5/2008 | Srikrishna | .................... | 370/238 |
| 7,408,907 B2 * | 8/2008 | Diener | ......................... | 370/338 |
| 7,539,489 B1 * | 5/2009 | Alexander | .................... | 455/423 |
| 2004/0047324 A1 * | 3/2004 | Diener | ......................... | 370/338 |
| 2005/0018611 A1 * | 1/2005 | Chan et al. | .................... | 370/241 |
| 2005/0025182 A1 * | 2/2005 | Nazari | ........................ | 370/469 |
| 2005/0036487 A1 * | 2/2005 | Srikrishna | .................... | 370/389 |
| 2005/0153725 A1 * | 7/2005 | Naghian et al. | ............... | 455/520 |
| 2005/0164684 A1 | 7/2005 | Chen et al. | | |
| 2005/0254474 A1 * | 11/2005 | Iyer et al. | ...................... | 370/338 |
| 2006/0018303 A1 * | 1/2006 | Sugiarto et al. | ............... | 370/352 |
| 2006/0083356 A1 | 4/2006 | Adams et al. | | |
| 2006/0256737 A1 * | 11/2006 | Choi et al. | .................... | 370/254 |
| 2007/0060064 A1 * | 3/2007 | Srikrishna et al. | ......... | 455/67.11 |
| 2007/0099624 A1 * | 5/2007 | Guo | .............................. | 455/453 |
| 2007/0115907 A1 * | 5/2007 | Myles et al. | .................. | 370/338 |
| 2007/0127559 A1 | 6/2007 | Chang | | |
| 2008/0057483 A1 * | 3/2008 | Avidan | ......................... | 434/362 |
| 2008/0205420 A1 * | 8/2008 | Srikrishna et al. | ............ | 370/401 |

* cited by examiner

*Primary Examiner* — Edward Urban
*Assistant Examiner* — Ganiyu A Hanidu
(74) *Attorney, Agent, or Firm* — Brian B. Short

(57) ABSTRACT

Methods of correlating wireless network performance of a wireless network are disclosed. One method includes collecting wireless network performance parameters at a location of the network, observing at least one of activities and conditions of the wireless network over the period of time, and correlating the wireless network performance parameters with at least one of the activities and conditions of the wireless network. The wireless network performance parameters can be collected by one or more test devices operating at nodes or clients within the wireless network.

23 Claims, 5 Drawing Sheets

| Performance Parameters 510 | Activity or Condition 520 | Correlated Behavior and A Method of Mitigating 530 |
|---|---|---|
| 1. Reduction in Throughput | High Traffic on Upstream Device -- Condition | Detect Hidden Node – New Route, New Channel, RTS/CTS |
| 2. Decreased Reverse Packet Success | Upstream Device Packet Collisions -- Condition | Detect Hidden Node – New Route, New Channel, RTS/CTS |
| 3. Reduced Throughput | Upstream Device Packet Collisions -- Condition | Detect Hidden Node – New Route, New Channel, RTS/CTS |
| 4. Reduced Available Airtime, or Increased Latency, or Decreased Throughput | Large Number of Clients Associated with Upstream Device -- Condition | Too Many Node on Common Channel – Reselect Channels |
| 5. Low SNR | Low Upstream Node Transmission Power-- Condition | Low Transmission Power – Increase Transmission Power |
| 6. Low SNR | High Noise on Upstream Node Transmission Signals-- Condition | Non-Network Interference – Reselect Transmission Channel |
| 7. High Number of Retries Required | Upstream Node Having a Large Number of Neighbors-- Condition | Self-Interference – Lower Transmit Power of Nodes |
| 8. Any of Performance Parameters Measured to be Poor | New Route Selection or New Channel Selection -- Activity | Reselect Route, Reselect Channel or any of mentioned Corrective Actions |

FIGURE 5

IDENTIFYING CORRELATIONS WITHIN WIRELESS NETWORKS

CROSS-REFERENCES TO RELATED APPLICATION(S)

The present application is based on and claims the benefit of U.S. Provisional Patent Application Ser. No. 60/921,761, entitled "Quantifying End User Experience", filed on Apr. 3, 2007, the disclosure of which is hereby incorporated by reference in entirety for all purposes.

FIELD OF THE INVENTION

The invention relates generally to wireless communications. More particularly, the invention relates to a method and apparatus for identifying correlations within wireless networks.

BACKGROUND OF THE INVENTION

Wireless networks typically allow a wireless device to connect to the wireless networks through a base station or access point that is wired to the network. The wireless device can transmit data packets that are received by the base station or access point and then routed through the network. The wireless network can include many base stations or access points that are each wired to the network.

Wireless networks include wireless links that are susceptible to interference. Wireless mesh networks typically include many wireless links, and therefore, can be particularly susceptible to interference. One form of interference is self interference, in which a wireless link within the wireless mesh network receives interfering signals from other wireless links of the wireless mesh network. As packets are relayed through the wireless mesh network, they can suffer from the effects of self-interference, or they may cause interference to other links within the wireless mesh network.

The self-interference can limit the air-time availability to nodes of a wireless network. That is, the self-interfering signals of a node within a wireless network occupy transmission air-time, thereby limiting the transmission air-time available to other nodes of the wireless network. Nodes that have poor quality wireless links can be particularly problematic because they typically require low-order modulation formats, and high packet re-transmissions. Lower order modulation formats and re-transmissions both cause the air-time per bit efficiency to drop, resulting in the occupation of more air-time for each successfully transmitted bit.

Due to the interconnectivity of many devices within a wireless mesh network, activities and conditions of devices within the wireless mesh network can greatly influence the operation of other devices within the wireless mesh network. For example, load imbalances in one area of a mesh network can adversely affect the operation of the mesh network at other locations. Additionally, channel selections and routing path selections of some devices can adversely affect the operation of other devices within the same wireless mesh network.

It is desirable to have a method and apparatus for monitoring conditions of a wireless network. It is additionally desirable to be able to locate network condition, and correlate conditions and activities of the wireless network with operating parameters of the wireless network.

SUMMARY

An embodiment includes a method of correlating wireless network performance of a wireless network. The method includes collecting wireless network performance parameters at a location of the network, observing at least one of activities and conditions of the wireless network, and correlating the wireless network performance parameters with at least one of the activities and conditions of the wireless network. The wireless network performance parameters can be collected by one or more test devices operating at nodes or clients within the wireless network.

Another embodiment includes a system for correlating wireless network performance of the wireless network. The system includes a test device collecting wireless network performance parameters at a location of the network over at least a period of time. At least one device of the wireless network observes activities and/or conditions of the wireless network over the period of time. The wireless network performance parameters are correlated with the activities and conditions of the wireless network.

Other aspects and advantages of the described embodiments will become apparent from the following detailed description, taken in conjunction with the accompanying drawings, illustrating by way of example the principles of the described embodiments.

BRIEF DESCRIPTION OF THE DRAWINGS

FIG. 5 is a table that includes examples of collected wireless network performance parameters, network activities and conditions, and possible correlations between the wireless network performance parameters and network activities and conditions.

DETAILED DESCRIPTION

The embodiments described provide methods of locating network conditions of wireless networks. Additionally, wireless network parameters can be sensed at one or more locations within the wireless network, and correlations between the wireless network parameters and activities and conditions of the network can be used to modify operation of the wireless network.

The following embodiments and descriptions are directed to wireless mesh networks. However, it is to be understood that the embodiments described are not limited to wireless mesh networks. Wireless networks in general can benefit from the methods of locating and monitoring network conditions.

Figure 1:
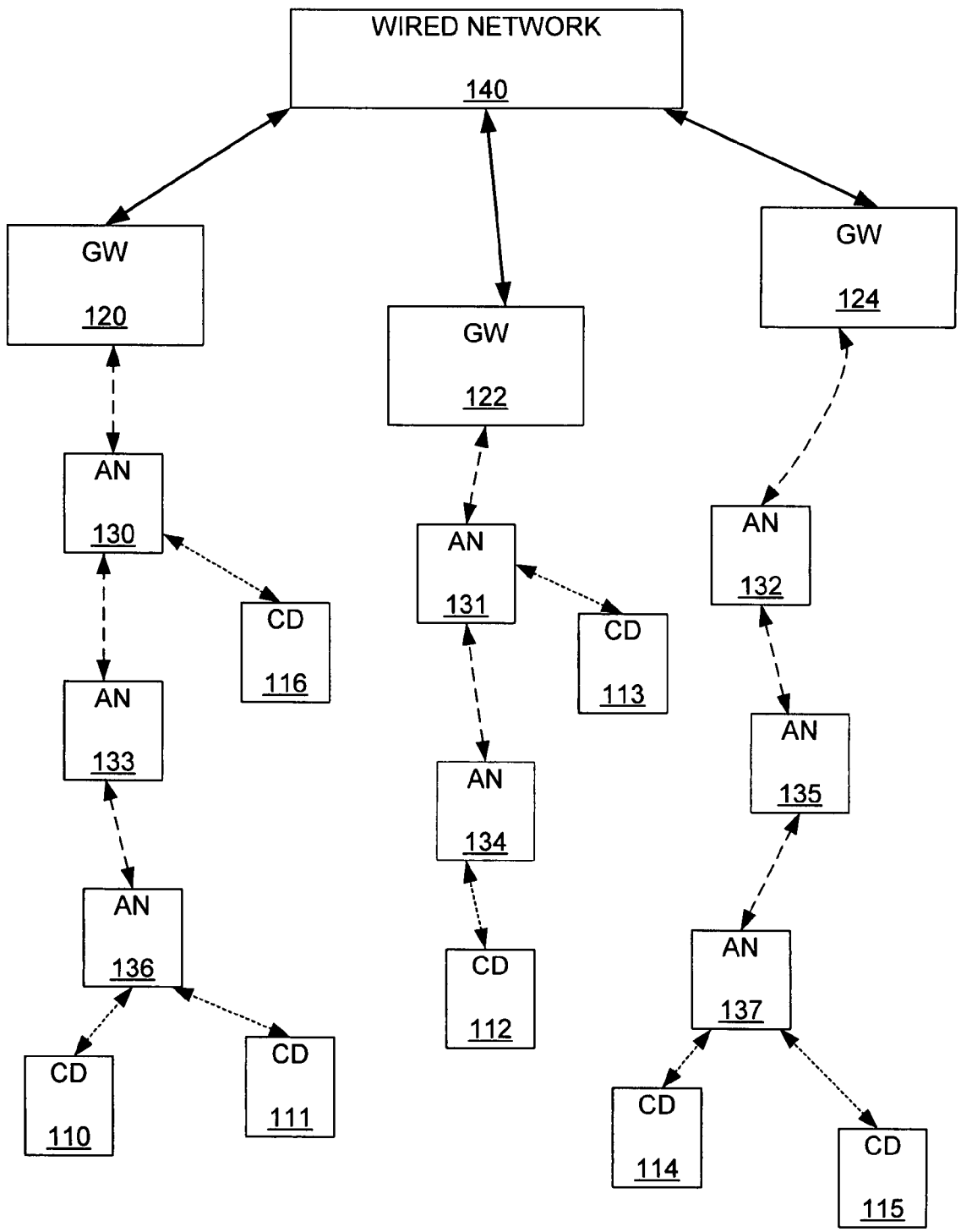
FIG. 1 shows an example of a wireless mesh network.

FIG. 1 shows an example of a wireless mesh network that includes gateways 120, 122, 124, access nodes 130-137 and client devices 110-116. The wireless access nodes 130-137 interconnect with each other, and with gateways 120, 122, 124 to form a mesh.

One embodiment of a gateway originates routing beacons that the access nodes can use to select routes to at least one gateway based on a persistence of successfully received routing beacons. The gateways typically include a backhaul (wired or wireless) to a wired network 140 that provides access to the internet.

An access node can generally be defined as being a device that a client device can associate with to obtain access to the mesh network, and therefore, access the internet. Typically, a gateway can additionally operate as an access node. One embodiment of an access node re-broadcasts successfully received routing beacons (from either an upstream gateway or access node).

A client generally can include a laptop computer, a personal digital assistant (PDA), a cell-phone, or any other device that includes an interface card adaptable for use with the mesh network of the invention. The client can access the network though wired or wireless connections.

The access nodes 130-137 form routing paths through the wireless mesh network. Client devices 110-116 wirelessly connect to any one of the gateways 120, 122, 124 or access nodes 130-137 to obtain a data path to the wired network 140. An embodiment of the access nodes selects routing paths to at least one gateway based on a persistence of successfully received routing beacons.

The example of a wireless mesh network of FIG. 1 includes the three gateways 120, 122, 124. Each gateway 120, 122, 124 defines a cluster. For example, a first cluster of the gateway 120 includes access nodes 130, 133, 136. A second cluster of the gateway 122 includes access nodes 131, 134. A third cluster of the gateway 124 includes the access nodes 132, 135, 137.

Due to the interconnectivity present in any mesh network, activities or conditions of one part of the mesh network can influence the operation of other parts of the mesh network. Additionally, the interconnections are wireless links, and therefore, the air-time occupied by wireless links of each of the access nodes 130-137 and client device 110-116 can affect the operation of other devices of the mesh network because air-time is shared among all interfering links.

Conditions of a device (gateway or access node) located at one part of a wireless network can influence the operating of devices elsewhere within the wireless network. For example, device (gateway or access node) load, device routing selections through the mesh network, bandwidth of the device, latency of the device, channel selections of the devices and any malfunction of the devices can all influence the operation of other wireless network devices.

Loading of one device can influence the operation of other devices because a device that is subject to a large amount of data traffic (due, for example, to a large client load) can adversely influence the operating parameters of all devices downstream of the device. For example, if an access node within the wireless mesh network has many downstream clients, then the bandwidth available to each client can be limited. More generally, the bandwidth to all devices downstream of the heavy-loaded device will be influenced. Additionally, excessive loading of a device generally occupies high air-time, and therefore, also can influence other devices within the wireless mesh that are not downstream of the device.

Routing selections of one device can influence the operation of other devices within the mesh network because poor routing selections can result in poor quality links within a routing path to a gateway. Poor quality links can cause a host of problems, such as, low throughput and excessive air-time occupation. Poor link quality affects the air-time occupied by signals transmitted through the link because poor links typically require the signals to have lower-order modulation formats. Therefore, the amount of air-time occupied per bit successfully transmitted bit goes up. Additionally, poor quality links typically require more re-transmissions, which also increases the air-time occupied per bit.

Routing selections also influence the loading of devices within the network, which as previously described, influences other devices. Routing selections can also influence the latency of data traffic.

Bandwidth of one device can influence the operation of other devices because throughput of a device influences all devices downstream of the device. A limited throughput can also cause more air-time to be occupied when attempting to maintain a given data rate. Additionally, a limited throughput will typically cause additional latency.

Latency of one device can influence the operation of other devices because excessive latency of a device can slow the operation of all devices downstream of the device. This can also cause additional use of air-time.

Depending upon the physical locations of the access nodes, certain access nodes are more likely to interfere with other nodes of the wireless network. Neighbor nodes can be defined as other nodes that can receive signals from a node, wherein the received signals at least have a predetermined signal strength. Neighboring nodes can be a source of self-interference, and can cause the air-time available to a node to fall below desirable levels.

All wireless communication between the nodes occupies air-time. Air-time is additionally occupied when client devices 110-115 are connected to the wireless mesh network. The time occupied by each client device connection is generally not equal. That is, the air-time occupied can vary greatly from client device to client device. Generally, the air-time occupied by a client device is dependent upon the qualities of the links between the client device and the gateway the client device is routed to, and the number of wireless hops (a hop is a wireless link) between the client device and the gateway. The more wireless hops a client device or node is away from a gateway, the greater the effect a client device or node can have on the available air-time capacity. That is, each link between the client device or node and the connecting gateway occupies air-time.

Generally, a range exists around an access node (such as access node 134) such that wireless links within this range can reduce the air-time available to the access node 134. Medium access protocols, such as, IEEE 802.11, implement Carrier Sense Multiple Access with Collision Avoidance (CSMA/CA). In such protocols, transceivers sense a channel and defer transmissions while the channel is considered to be busy. The channel is deemed to be busy if a received signal exceeds a Clear Channel Assessment Threshold (CCAT). Therefore, if the access node 134 is receiving transmitted signals from at least one wireless device, the access node 134 may be unable to either transmit any signal or receive any signal from another wireless device. As such, at some point the available air-time can become so limited that the access node 134 cannot properly operate within the wireless mesh network.

Wireless network parameters of each individual device can provide an indication of the operation of the device itself. For example, a client device or access node within the mesh network has network parameters, such as, received signal strength, receive SNR, upstream throughput, downstream throughput (for an access node), latency, Quality of Service (QoS) and/or available air time, which provide an indication of the operation of the device. Each of these network parameters can be influenced by the activities and/or conditions of other devices within the wireless network.

Figure 2:
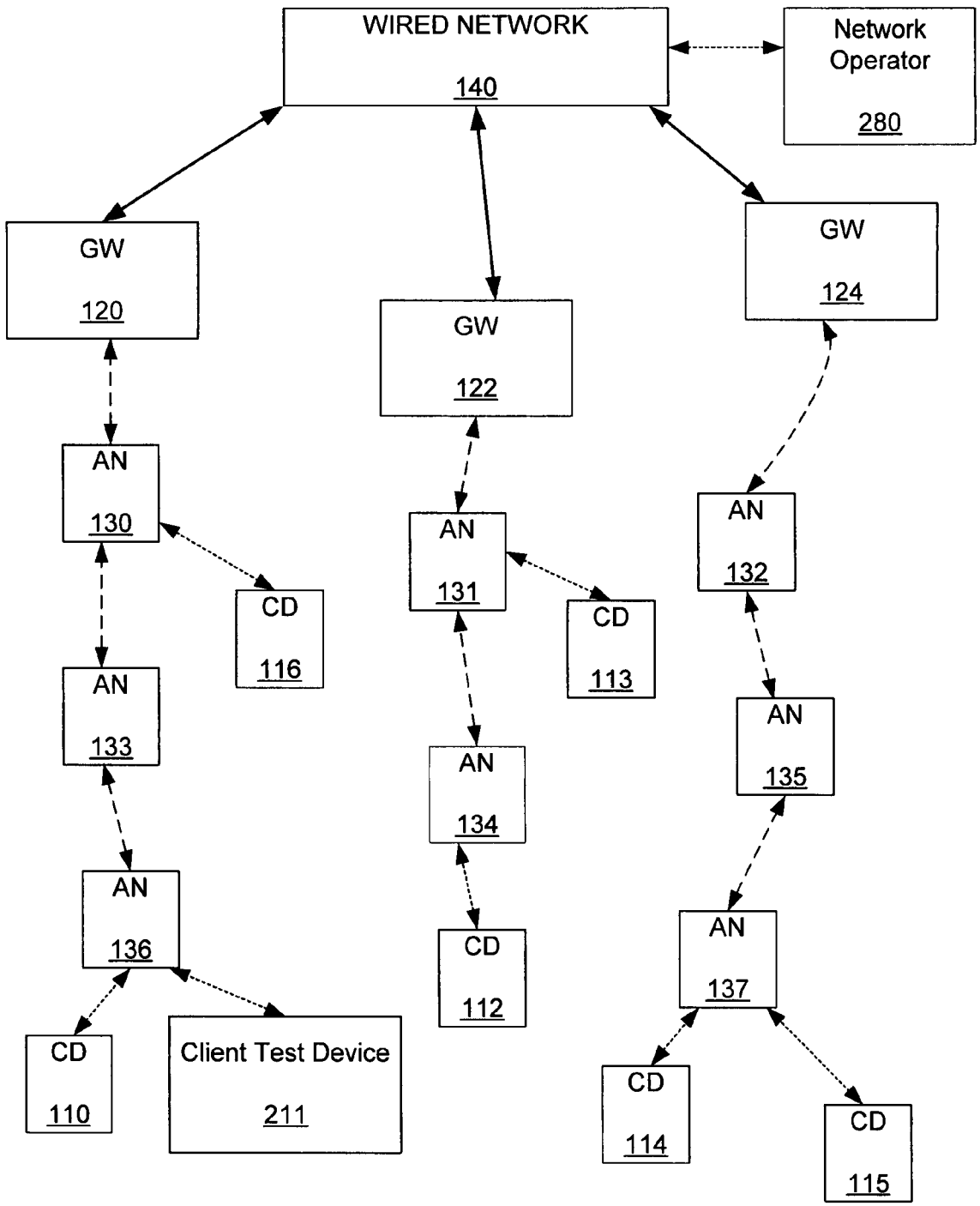
FIG. 2 shows an example of a client test device connected to a wireless mesh network.

FIG. 2 shows an example of a client test device 211 connected to a wireless mesh network. For an embodiment, the client test device 211 monitors wireless network performance information as is expected to be experienced by a client device associated with the wireless network. The client test device 211 can be used to locate problems within the wireless network. The client test device 211 can, for example, alert a network operator 280 of identified network conditions and the locations of the network conditions.

One embodiment of the client test device 211 tests multiple hops of the wireless mesh network to identify a location of a network condition. The network conditions can include, for example, an upstream (or downstream) device that is exhibiting behavior that may be detrimental to the operation of the wireless network. For example, the device may have excessive upstream latency, excessive downstream latency, excessive upstream throughput, excessive downstream throughput, a high number of packet retries per packet, low packet success probability, low reverse packet success probability, and antenna asymmetry. Such network conditions may be degrading the network performance as experienced by the test client device. Identification of the location of the network condition is valuable information that can be used to eliminate or mitigate the effects the condition has on the performance of the wireless network.

One method of locating the network condition includes testing the condition over a first set of wireless hops and then testing the condition over a different set of wireless hops. Comparison of the two tests can provide information regarding the location of the network condition. One embodiment method of locating the network condition includes running a trace route test over the two different sets of wireless hops.

One embodiment of a latency network condition test includes sending a probe packet from the test device to a first target device located a first number of wireless hops from the test device, having the first target device send a response packet back to the test device, and measuring the round trip travel time of the probe-response pair of packets. The test device can locate latency network conditions by then sending another probe packet from the test device to second target device located a second number of wireless hops from the test device, and comparing the round trip travel time for probe packets of the first and second target devices.

One embodiment of a throughput (upstream) network condition test includes sending as many data packets as possible during a predetermined length of time (for example, 2 seconds) from the test device to the first target device located a first number of hops away, and measuring the number of packets sent. Packets that fail to be received by the first target device are retried (transmitted again) because an acknowledgement (ACK) is not received by the sender (the test device). The measured number of packets sent is multiplied by the bytes/packet, and divided by the predetermined length of time to obtain the throughput between test device and the first target device. The same process is repeated with the second target device located a second number of wireless hops away from the test device to obtain the throughput between the test device and the second target device.

A downstream throughput test can be tested using methods similar to the upstream throughput test. However, the first and second target devices can be instructed to send as many data packets as possible during the predetermined length of time (for example, 2 seconds) from the target devices to the test device. Packets that fail to be received by the test device are retried (transmitted again) because an acknowledgement (ACK) is not received by the target device. The measured number of packets sent is multiplied by the bytes/packet, and divided by the predetermined length of time by both the first target device and the second target device to obtain the throughput between target devices and the test device.

One embodiment of a packet retry network condition test includes the test device transmitting, for example, 802.11 protocol unicast packets. The unicast packets must receive an ACK, otherwise, the unicast packets are resent (retried). The number of retries can be counted for unicast packets sent to both the first target device and the second target device. The results can be compared to locate a network condition, such as, number of packet retries.

Other network conditions can include parameters that reflect qualities of links within paths between the test device and the first and second target devices. For example, received signal strength, SNR, packet success probability (typically, in the downstream direction), reverse packet success probability (typically, in the upstream direction) and antenna asymmetry (typically measured by comparing the signal quality of signals of more than one antenna of the device) of a device can all be monitored by the devices within the upstream and downstream paths. The signal quality can be determined by measuring the success rate of received packets. The test device can request these link quality parameters from the first and second target devices, allowing the test device to locate network conditions related to link quality parameters.

An exemplary embodiment can include detecting an airtime capacity problem, and then modifying operation of other devices to mitigate the air-time capacity problem. The embodiments of controlling air-time include sensing an airtime availability problem, and taking steps to reduce the problem. Other embodiments include taking steps to help ensure that air-time availability problems don't occur.

Figure 3:
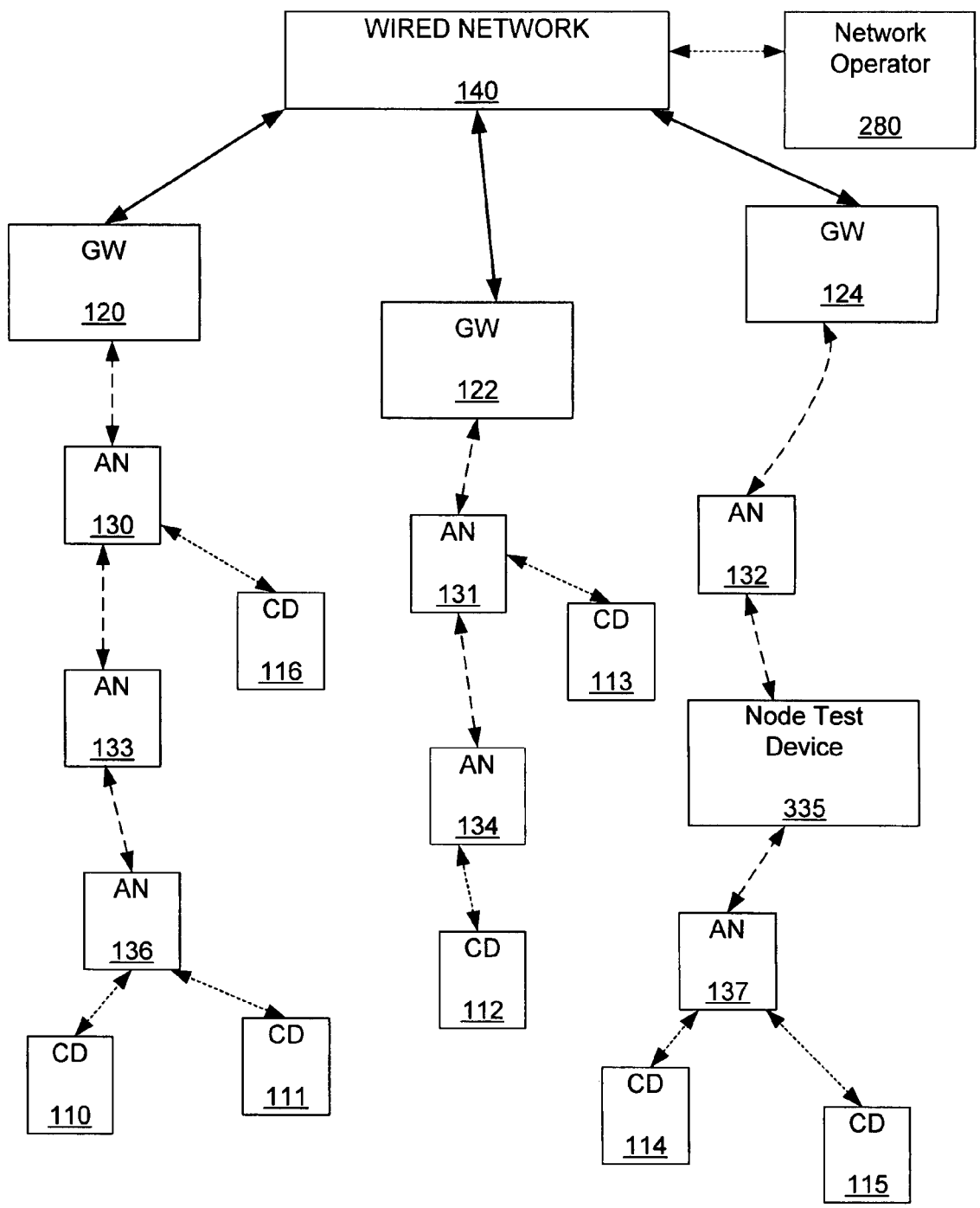
FIG. 3 shows an example of access node test device connected to a wireless mesh network.

FIG. 3 shows an example of network node test device 335 connected to a wireless mesh network. For an embodiment, the node test device 335 monitors wireless network performance information as expected to be experienced by a similarly placed node of the wireless network.

Fundamentally, the node test devices can operate at a higher transmit power than the client test devices. The node test devices are located within the wireless mesh network, and can have both upstream (towards a gateway) and downstream (away from a gateway) paths. Additionally, node test devices can be placed at a higher elevation (typically, for example, at the top of a street light) than the client test devices. All of these differences between the node test devices and the client test devices can change the network conditions experienced by node test devices as compared to the client test devices.

One embodiment of the node test device 335 tests multiple hops of the wireless mesh network to identify a location of a network condition. The network condition can include, for example, an upstream (or downstream) device that is exhibiting behavior that may be detrimental to the operation of the wireless network. For example, the device may have excessive upstream latency, excessive downstream latency, excessive upstream throughput, excessive downstream throughput, a high number of packet retries per packet, packet success probability, reverse packet success probability and/or antenna asymmetry. The network condition may be degrading the network performance as experienced by the node test device. Identification of the location of the network condition can be a valuable piece of information that can be used to eliminate or mitigate the effects the condition has on the performance of the wireless network.

One method of locating the network condition includes testing the condition over a first number of wireless hops and then testing the condition over a different number of wireless hops. Comparison of the two tests can provide information regarding the location of the network condition. One embodiment method of locating the network condition includes running a trace route test over the two different numbers of wireless hops.

The methods of determining network condition latency, throughput (upstream and upstream), packet retries (upstream and downstream), signal strength, SNR, packet success probability (forward, reverse, upstream and downstream), an antenna asymmetry tests for the node test device can be similar to the client test device methods previously described. One fundamental difference, however, is that the node test devices typically have downstream target devices as well.

Figure 4:
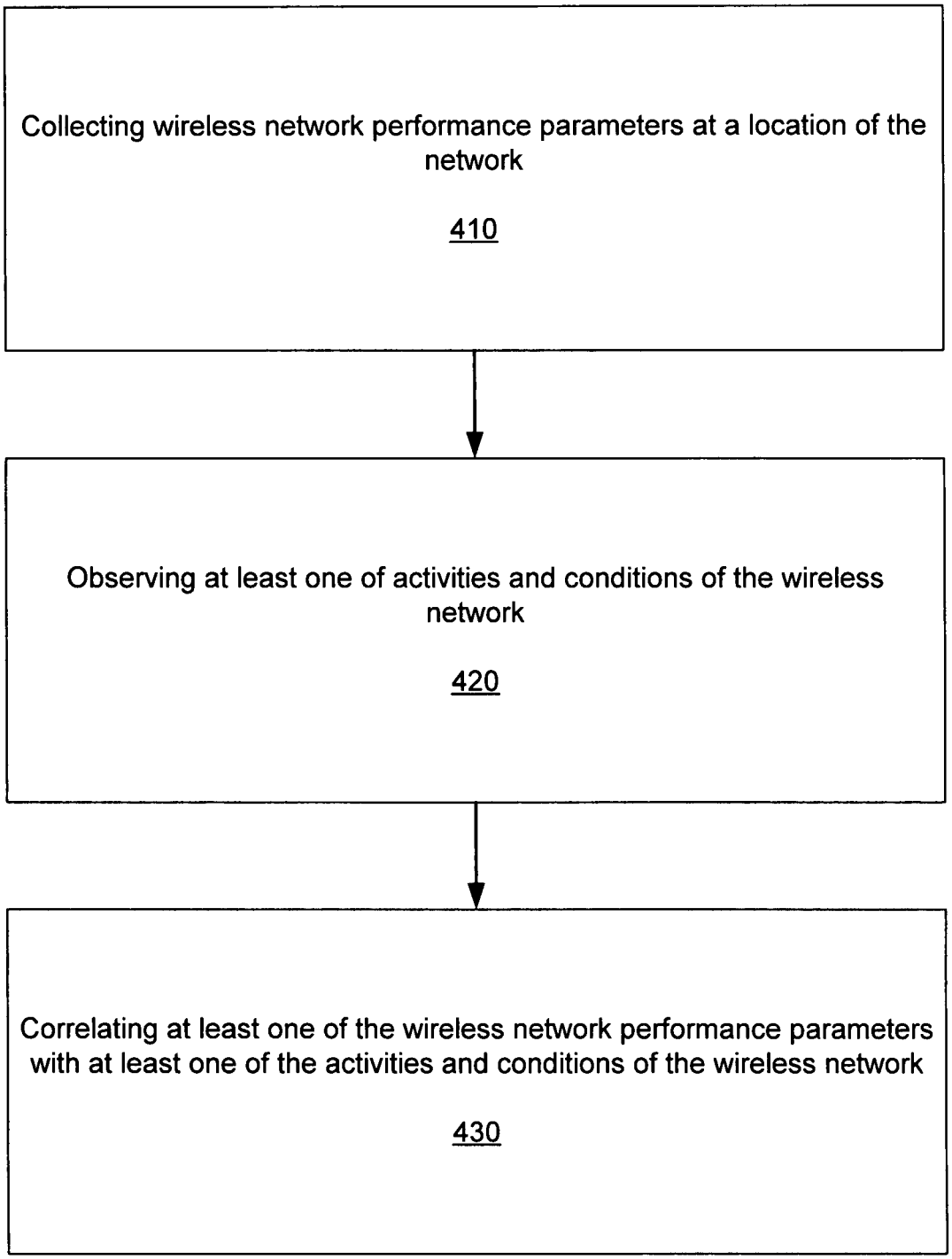
FIG. 4 is a flow chart that shows one example of steps of a method of correlating wireless network performance of a wireless network.

FIG. 4 is a flow chart that shows one example of steps of a method of correlating wireless network performance of a wireless network. A first step 410 includes collecting wireless network performance parameters at a location of the network. The wireless network parameters can be collected real-time, or the wireless network performance parameters can be collected over a predetermined period of time. A second step 420 includes observing at least one of activities and conditions of the wireless network over the period of time. A third step 430 includes correlating the wireless network performance parameters with at least one of the activities and conditions of the wireless network.

The wireless network performance parameters can be collected by a test device. As previously described, the test device can operate as an access node within a wireless network, or as a client device associated with the wireless network. Examples of wireless network performance parameters that can be collected by the test devices includes, for example, receive signal strength, receive signal SNR, transmission retries, upstream data throughput, downstream data throughput, upstream latency, downstream latency, and available airtime.

For an embodiment, the wireless network performance parameters are correlated with the conditions at one or more locations within the wireless network. The wireless network conditions can be monitored by one or more devices within the wireless network, and reported to the test device, or stored at in a location that can be retrieved by the test device. Alternatively, both the network conditions, and the wireless network performance parameters are stored where they can be retrieved by another device that performs the correlation analysis, or they are reported directly to the other device that performs the correlation analysis. A non-exhaustive list of examples of wireless network conditions includes upstream latency, downstream latency, upstream throughput, downstream throughput, number of packet retries, packet success probability, reverse packet success probability, and antenna asymmetry of at least one of the first plurality of wireless hops.

For another embodiment, the wireless network performance parameters are correlated with the activities at one or more locations within the wireless network. The wireless network activities can be monitored by one or more devices within the wireless network, and reported to the test device, or stored at in a location that can be retrieved by the test device. Alternatively, both the wireless network activities, and the wireless network performance parameters are stored where they can be retrieved by another device that performs the correlation analysis, or they are reported directly to the other device that performs the correlation analysis. A non-exhaustive list of examples of wireless network activities includes routing selections of devices within the wireless network, and channel selections of devices within the wireless network.

Another embodiment includes collecting wireless network performance parameters at a plurality of locations of the wireless network over at least a period of time. That is, more than one test device can be included within the wireless network. The inclusion of multiple test devices collecting the wireless network performance parameters allows for more information about the wireless network, and therefore, can provide more intelligent analysis, which can improve the detection of correlations of the wireless network performance parameters, and the conditions and activities of other devices within the wireless network.

Once correlations within the wireless network have been detected, one embodiment includes alerting at least one device within the wireless network of at least one observed correlation. By alerting another device within the wireless network, one or more actions can be taken by one or more devices within the wireless network to mitigate or eliminate one or more poor performance wireless network parameters. For example, poor wireless network performance as indicated by collected wireless network performance parameters by a test device can be correlated with an upstream node within a wireless mesh network selecting a new routing path or selecting a new transmission channel. Once the correlation has been detected, it can be reported, for example, to the upstream device. Based on knowledge of the poor wireless network performance parameters of the downstream test device, and the detected correlation with the new selection of the upstream device, the upstream device can make a new selection, or modify some of its operating parameters to mitigate or eliminate the poor wireless network performance. The upstream device can, for example, select a new routing path, select a new transmission channel, or force dis-association of one or more downstream clients. Alternatively, or additionally, the upstream (or other device) can modify wireless network characteristics to mitigate problems detected by the collected wireless network performance parameters. For example, the upstream (or other device) can modify transmission power, transmission bit rate, and/or packet QoS.

Another embodiment includes the wireless test device, or another device that the wireless test device provides the wireless network performance parameters to, collecting the wireless network performance parameters over time. Therefore, the correlations can also be made with previously collected wireless network performance parameters. That is, historical knowledge can additionally be used to determine correlations. For example, correlated information can lead to changing the channel assignment of part of the wireless network.

As previously described, the collection and storage of both the wireless network performance parameters, and the wireless network conditions and activities of the wireless network, can be at any of several different wireless network locations, such as, at the test device, at a management server, or at one or more other devices of the wireless network. For one embodiment, a network management server collects the wireless network performance parameters and observes the activities and conditions, and performs the correlations. For another embodiment, a network device collects the wireless network performance parameters, observes the activities and conditions, and performs the correlations.

FIG. 5 is a table that includes examples of collected wireless network performance parameters, network activities and conditions that may be correlated to the collected wireless network performance parameters, and actions that can be taken to mitigate wireless network performance parameters that indicate problematic (sub-optimal) network performance. The first column 510 is a list of collected performance parameters that indicate poor or sub-optimal network performance. As previously described, the performance parameters can be collected by a test device that is operating at either a node within the wireless network, or as a client device within the wireless network. The second column 520 is a list of wireless network conditions or activities that may be correlated to poor network performance parameters. The third column 530 is a list of actions that can be taken to mitigate the poor network performance as indicated by the collected wireless network performance parameters.

It is to be understood that the test devices (node or client) generally collect the wireless network performance parameters. However, the correlations of the wireless network performance parameters with the network conditions and activities, and the controlling of other devices within the network to mitigate the poor wireless network performance parameters, can be done by the test device, or as previously described, by a network manager, or some other network devices.

A first listed performance parameter includes the test device (typically a node) measuring (or sensing) a reduction in throughput of the test device. A condition of another device within the wireless network that can be correlated with the low throughput includes a high traffic condition of an upstream device. The high traffic condition may be resulting in a hidden node condition, which could be alleviated by a new routing path selection, a new transmission channel selection, and/or activation of a RTS (request to send)/CTS (clear to send) mode of the upstream device.

The hidden node condition includes two wireless devices that are each able to wirelessly communicate with a third device, but not to each other. Therefore, each can interfere with the other's wireless communication with the third device. The test devices (client and/or access node) can help to identify hidden nodes. Once identified, the hidden node conditions can be addressed, for example, by a new channel selection, activation of RTS/CTS, a new route selection, or a change in transmit power.

A second listed performance parameter includes the test device (typically a node) measuring a reduction in reverse packet success probability (RPSP) of the test device. That is, the rate at which packets of the test device transmitted upstream fail at a greater rate than expected. A condition of another device within the wireless network that can be correlated with the low RPSP includes upstream device packet collisions or high traffic condition of an upstream device. Again, the packet collisions or the high traffic condition may be resulting in a hidden node condition, which can be alleviated by a new transmission channel selection, activation of a RTS (request to send)/CTS (clear to send) mode of the upstream device, and/or a new routing path selection.

A third listed performance parameter includes the test device (typically a node) measuring a reduction in available air-time and/or an increase in latency experienced by the test device. A condition of another device within the wireless network that can be correlated with the reduction in available air-time and/or an increase in latency includes upstream device packet collisions or high traffic condition of an upstream device. Again, the packet collisions or the high traffic condition may be resulting in a hidden node condition, which could be alleviated by a new transmission channel selection, activation of a RTS (request to send)/CTS (clear to send) mode of the upstream device, and/or a new routing path selection.

A fourth list of performance parameters includes a reduced available air-time, increased latency and/or decreased throughput as observed by the test device. A condition of another device within the wireless network that can be correlated with the reduced available air-time, increased latency and/or decreased throughput includes upstream device packet having too many nodes. For example, the upstream device could be an upstream gateway that has too many nodes selecting a routing path through the upstream gateway. The poor wireless network performance as suggested by the wireless network performance parameters can be mitigated, for example, by the upstream device reselecting its transmission channel. This can influence the routing paths within the wireless network, and reduce the number of nodes associated with the upstream device.

A fifth listed network performance parameter includes the test device (typically, a client test device) measuring a receive signal to noise ratio (SNR). A low SNR can cause a host of problems including reduced data throughput, packet retries and latency. The low SNR can be correlated to a low transmission power of an upstream device. The low SNR can be improved, for example, by increasing the transmission power of the upstream device.

A sixth listed network performance parameter also includes the test device (typically, a client test device) measuring the receive SNR. As mentioned, the low SNR can cause a host of problems including reduced data throughput, packet retries and latency. The low SNR can be correlated to high noise or interference within the transmission channel due, for example, to non-network (external) interference. The low SNR can be improved, for example, by reselecting the transmission channel of an upstream device to a transmission channel that has less interfering noise.

A seventh list network performance parameter includes the test device (typically a test node device) requiring a higher than expected number of transmission packet retries. The high number of retries can be correlated to an upstream node having a large number of neighbors, and therefore, low airtime availability. The self-interference caused by the large number of neighbors can be mitigated, for example, by reducing the transmission power of the neighboring nodes.

An eighth list network performance parameter includes any of the above-listed performance parameters collecting at either a node test device or at a client test device. The performance parameters can be correlated to another device (upstream or otherwise) making a selection. A non-exhaustive list of examples of selections includes routing selections, channel selections and/or transmission power selections. Once the correlation has been made, additional intelligence can be obtained by the wireless network performance parameters collected by one or more test devices. A given selection can then be reevaluated to determine whether it was the best selection. Alternatively, or additionally, one or more network devices can modify or update their operation.

Although specific embodiments have been described and illustrated, the embodiments are not to be limited to the specific forms or arrangements of parts so described and illustrated.

What is claimed:
1. A method of correlating wireless network performance of a wireless network, comprising:
   collecting, by a test device, wireless network performance parameters, at a location of the network wherein the wireless network performance parameters comprises at least one of throughput, latency, airtime and retries;
   observing at least one condition of the wireless network at another device located in a different location of the wireless network than the test device, wherein the at least one condition comprises at least one of a large number of clients, or a high number of retries;
   correlating a reduction in network performance as indicated by the wireless network performance parameters with the at least one condition of the wireless network, comprising determining from a table an association between the collected wireless network performance parameters and the at least one condition;

based on the association, taking action to mitigate the reduction in network performance as indicated by the collected wireless network parameters, comprising at least one of selecting a new route, reselecting channels, or selecting a lower transmission power, as specified by the table.

2. The method of claim 1, further comprising the test device operating as a client device collecting the wireless network performance parameters.

3. The method of claim 1, further comprising the test device operating as a wireless network node collecting the wireless network performance parameters.

4. The method of claim 1, wherein the at least one condition further includes at least one of a upstream latency, downstream latency, upstream throughput, downstream throughput, a number of packet retries, packet success probability, reverse packet success probability, and antenna asymmetry of at least one of a plurality of wireless hops.

5. The method of claim 1, wherein the at least one condition further includes at least one of routing selections or channel selections at another device located in a different location of the wireless network than the test device.

6. The method of claim 1, further comprising collecting wireless network performance parameters at a plurality of locations of the wireless network over at least a period of time.

7. The method of claim 1, further comprising alerting at least one device within the wireless network of at least one observed correlation.

8. The method of claim 1, further comprising modifying operation of at least one device within the wireless network based on at least one observed correlation.

9. The method of claim 8, further comprising the other wireless device modifying wireless network characteristics to mitigate problems detected by the collected wireless network performance parameters.

10. The method of claim 9, wherein the wireless network characteristic comprises at least one of routing selection, transmission channel selection, transmission power, transmission bit rate, packet QoS, dis-associating a client.

11. A method of correlating wireless network performance of a wireless network, comprising:
    collecting, by a test device, wireless network performance parameters at a location of the network;
    observing at least one of activities and conditions of the wireless network at an other device located in a different location of the wireless network than the test device;
    correlating a reduction in network performance as indicated by the wireless network performance parameters with at least one of the activities and conditions of the wireless network, comprising determining from a table an association between the collected wireless network performance parameters and the at least one of the activities and conditions; wherein
    associating the reduction in performance as indicated by the wireless network performance parameters with the conditions of the wireless network comprises the test device detecting a reduction in throughput, and associating the reduction in throughput with a high traffic condition of the other device, wherein the other device comprises an upstream device;
    based on the association, taking action to mitigate the reduction in network performance as indicated by the collected wireless network parameters, wherein the action comprises the other device at least one of selecting a new transmission channel, and selecting a new routing path as specified by the table.

12. A method of correlating wireless network performance of a wireless network, comprising:
    collecting, by a test device, wireless network performance parameters at a location of the network;
    observing at least one of activities and conditions of the wireless network at an other device located in a different location of the wireless network than the test device;
    correlating a reduction in network performance as indicated by the wireless network performance parameters with at least one of the activities and conditions of the wireless network, comprising determining from a table an association between the collected wireless network performance parameters and the at least one of the activities and conditions; wherein
    associating the reduction in network performance as indicated by the wireless network performance parameters with the conditions of the wireless network comprises the test device detecting a reduction in reverse packet success probability (RPSP), associating the reduction in RPSP with at least one of upstream device packet collisions and high traffic condition of the other device;
    based on the association, taking action to mitigate the reduction in network performance as indicated by the collected wireless network parameters, wherein the action comprises the other device at least one of selecting a new transmission channel and selecting a new routing path, as specified by the table.

13. A method of correlating wireless network performance of a wireless network comprising:
    collecting, by a test device, wireless network performance parameters, at a location of the network wherein the wireless network performance parameters comprises a throughput;
    observing at least one condition of the wireless network, wherein the at least one condition comprises at least one of packet collisions at an upstream device, and high traffic at the upstream device;
    correlating a reduction in network performance as indicated by the wireless network performance parameters with the at least one condition of the wireless network, comprising determining from a table an association between the collected wireless network performance parameters and the at least one condition;
    based on the association, taking action to mitigate the reduction in network performance as indicated by the collected wireless network parameters, comprising at least one of selecting a new route, selecting a new transmission channel, activation of a RTS (request to send)/CTS (clear to send) mode of the upstream device, as specified by the table.

14. The method of claim 13, further comprising the test device operating as a client device collecting the wireless network performance parameters.

15. The method of claim 13, further comprising the test device operating as a wireless network node collecting the wireless network performance parameters.

16. The method of claim 13, further comprising collecting wireless network performance parameters at a plurality of locations of the wireless network over at least a period of time.

17. The method of claim 13, further comprising modifying operation of at least one device within the wireless network based on at least one observed correlation.

18. The method of claim 17, wherein modifying the operation comprises at least one of influencing routing selection of the at least one device, influencing transmission channel selection of the at least one device, disassociating at least one client.

19. The method of claim 18, further comprising the other wireless device modifying wireless network characteristics to mitigate problems detected by the collected wireless network performance parameters.

20. The method of claim 19, wherein the wireless network characteristic comprises at least one of routing selection, transmission channel selection, transmission power, transmission bit rate, packet QoS, dis-associating a client.

21. A method of correlating wireless network performance of a wireless network, comprising:
  collecting, by a test device, wireless network performance parameters, at a location of the network wherein the wireless network performance parameters comprises SNR (signal to noise ratio);
  observing at least one condition of the wireless network, wherein the at least one condition comprises at least one of low upstream node transmission power or high noise on upstream node transmission;
  correlating a reduction in network performance as indicated by the wireless network performance parameters with the at least one condition of the wireless network, comprising determining from a table an association between the collected wireless network performance parameters and the at least one condition;
  based on the association, taking action to mitigate the reduction in network performance as indicated by the collected wireless network parameters, comprising at least one of increasing transmit power, reselecting a transmission channel, as specified by the table.

22. The method of claim 21, further comprising collecting wireless network performance parameters at a plurality of locations of the wireless network over at least a period of time.

23. The method of claim 21, further comprising modifying operation of at least one device within the wireless network based on at least one observed correlation.

* * * * *